Figure 1:
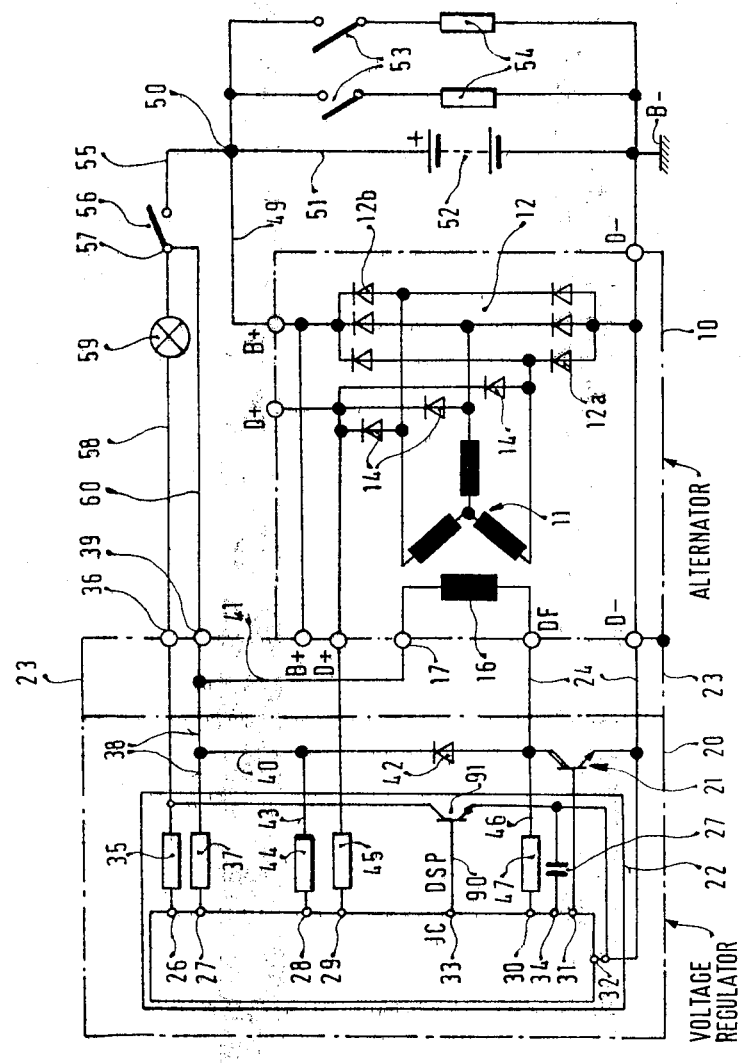

United States Patent [19]

Gansert et al.

[11] 4,413,222

[45] Nov. 1, 1983

[54] SELF-CONTAINED, PARTICULARLY VEHICULAR NETWORK WITH MALFUNCTION INDICATION

[75] Inventors: Willi Gansert, Kornwestheim; Ulrich Munz, Kirchheim; Edgar Kuhn, Gerlingen, all of Fed. Rep. of Germany

[73] Assignee: Robert Bosch GmbH, Stuttgart, Fed. Rep. of Germany

[21] Appl. No.: 314,493

[22] Filed: Oct. 23, 1981

[30] Foreign Application Priority Data

Nov. 8, 1980 [DE]  Fed. Rep. of Germany ....... 3042194

[51] Int. Cl.³ .............................................. H02J 7/16
[52] U.S. Cl. ...................................... 320/48; 320/64; 322/69
[58] Field of Search ............... 320/48, 61, 64; 322/24, 322/28, 69

[56]  References Cited
U.S. PATENT DOCUMENTS 4,210,856  7/1980  Taylor ............................ 320/61 X
4,316,134  2/1982  Balan et al. ..................... 320/48 X
4,360,772  11/1982  Vass ................................. 320/48 X
4,360,773  11/1982  Vass ................................. 320/64 X Primary Examiner—William M. Shoop
Attorney, Agent, or Firm—Frishauf, Holtz, Goodman & Woodward

[57]  ABSTRACT

A plurality of threshold switches or comparators, at least two and preferably five to seven are provided to compare actual generator output voltage ($u_g$) with respect to various threshold levels derived from battery voltage, and normal and abnormal and highly abnormal or excessive voltage conditions. Actual generator voltage is sensed by providing a separate set of rectifiers (14) connected to the generator (10) and providing output voltage signals representative only of the magnetism of the field—remanent or excited—and generator speed, independently of loading and battery voltage, to permit monitoring actual operation of the generator in relation to the connected network and battery. One (76) of the threshold switches or comparators is provided to inhibit energization of the field winding by the voltage regulator (20) if the voltage of the generator, as sensed, exceeds a predetermined level (eg. 18 V in a 12 V system), other threshhold switches providing malfunction indication upon concurrence of either excessive voltage, or undervoltage conditions at various test points within the generator-voltage regulator network system and combination.

16 Claims, 2 Drawing Figures

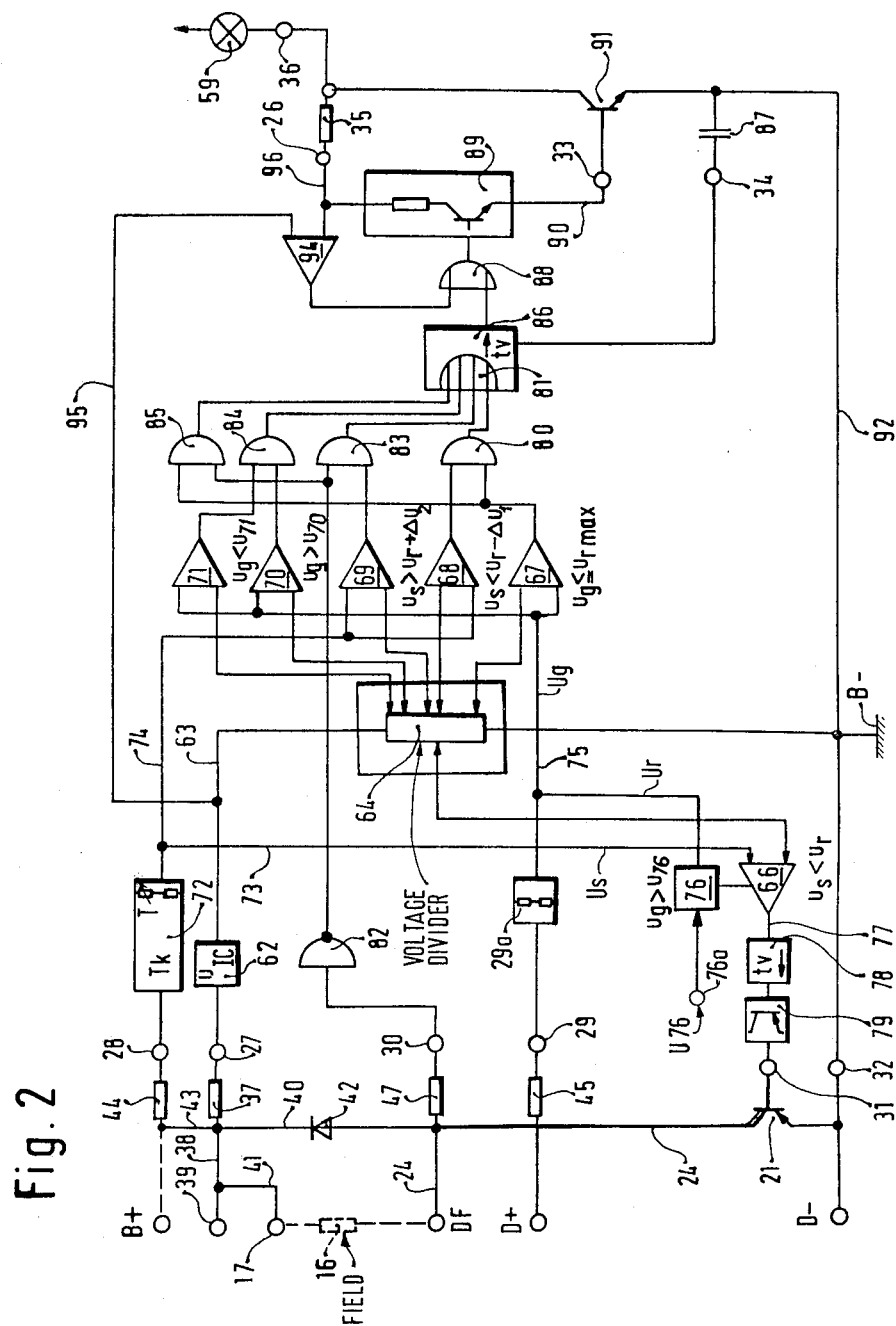

SELF-CONTAINED, PARTICULARLY VEHICULAR NETWORK WITH MALFUNCTION INDICATION

The present invention relates to self-contained electrical networks, for example for use as the on-board electrical network of automotive vehicles, boats, and the like, in which a prime mover, typically an internal combustion engine provides motive power for the vehicle and, additionally, power for an electrical generator, typically a three-phase alternator, to which a battery is connected for supply of electrical power to loads on the vehicle.

BACKGROUND

It has previously been proposed—see German patent disclosure document DE-OS No. 28 09 712, to utilize threshold switches which respond when certain operating parameters within the electrical network are passed. For example, stoppage of the generator can be indicated since the voltage of a generator will rapidly drop. Thus, an indication, for example, of belt-breakage of the belt drive of the generator in an automotive vehicle will be shown another threshold switch is provided to indicate malfunction of the voltage regulator, for example if the control switch, typically a transistor, within the voltage regulator should alloy-through so that the output voltage of the generator will rise to an excessive level. Another threshold stage can be provided which results in an indication if the command voltage for the generator should drop below a predetermined value, so that the main power switch of the regulator is erroneously blocked.

The signal inputs to the threshold stages are connected, in dependence on their function, to a predetermined junction point on the generator, to which cathodes of sensing diodes are connected as well as the terminal of the main switch, for example the ignition switch, which is remote from the battery junction.

The system is adequately suited to determine malfunction within the generator and the control system therefor. In some systems, however, it is also desirable to provide malfunction indication for faults in the electrical network, and associated elements, which are outside of the on-board network directly associated with the generator. It is, for example, desirable in some installations to also provide a monitoring arrangement which can determine the charge-state of the battery and to obtain a battery sensing signal if connected loads should exceed the power supply capabilities of the alternator so that, in due course, the battery would discharge.

THE INVENTION

It is an object to improve monitoring systems for self-controlled, particularly vehicular electrical networks to expand the capability of malfunction indication and to sense a larger number of possible defects within the network than heretofore.

Briefly, a number of threshhold switches are provided which are connected to a logic circuit which, in turn, is connected to control a malfunction or "trouble" indicator lamp, the threshhold switches being so connected that one of them receives a signal input derived from malfunction recognition diodes connected to the output of the generator itself to determine if the generator voltage, as derived from the armature windings thereof, is excessive, with respect to a reference; another threshhold circuit is connected to the battery to determine if the battery voltage is below a minimum reference level. Preferably, the recognition diodes are integrated with the generator, and the generator has a separate output terminal, forming a malfunction monitoring terminal.

It is highly desirable that, in the system of the invention, the exciter or field-winding of the generator is supplied from the power network of the vehicle, to which, also, the battery is connected, or on which the battery floats; and that the malfunction recognition diodes form a separate rectifier unit provided, essentially, only to determine proper operation of the generator, and of the network system. These diodes, then, can be of low current carrying or rectification capability. This reduces the overall cost of the system.

In accordance with a particularly desirable feature of the invention, a first threshhold stage responds when the generator voltage has a predetermined minimum which is above the voltage generated by the generator and due solely to remanence of the magnetic circuit thereof, at maximum design operating speed of the generator. Thus, a clear output indication can be obtained from this threshhold if the generator, when it operates, is properly excited, or if there is an interruption or malfunction in the excitation.

The threshhold stage can be readily so dimensioned that undesirable and spurious malfunction indications are suppressed if, in accordance with a further feature of the invention, the output indication from the minimum generator voltage is logically coupled with sensing elements, typically other threshhold switches, or other sensing circuits which permit response only if certain logic conditions are met, for example that the field control switching element, typically a transistor, is conductive but that, however, and in spite thereof, the generator voltage is not in excess of the threshhold of the first threshhold switch, and, preferably, the output is coupled through a logic AND-gate to provide an indication only if the generator voltage is not greater than the threshhold value of the first threshhold stage and, in addition, the battery sensed voltage is less than the threshhold value of the second threshhold switch, responsive to the battery voltage. This arrangement prevents malfunction indication if the voltage regulator, for example upon the termination of a charge cycle, interrupts charge voltage to the battery or, if the battery is fully charged and a load placed thereon has been suddenly disconnected, for example, upon running at highway speed and, suddenly, an air-conditioning unit is disconnected. The arrangement suppresses a malfunction indication which, otherwise, might arise if the generator is not excited and if the battery voltage is appropriate, since malfunction will be indicated only if the voltage at the battery sensing terminal differs by a predetermined difference from a predetermined minimum reference or command value.

If, then, a load is again connected to the system, for example reconnection of the air-conditioning unit—which may be under control of an automatic thermostat—the generator will again be excited if the sensing voltage drops below the reference or command value; this causes the voltage at the malfunction recognition diode terminal of the generator to rise. To prevent indication of malfunction—since, effectively, the system is working properly but within its own hysteresis—a time delay element is included in the circuitry which is so designed that it introduces a delay which corresponds to the rise time of the voltage from the minimum possible voltage due to remanent magnetism to the maximum possible voltage due to remanent magnetism and at minimum operating speed of the generator. Another indication can be obtained to determine if the field-winding of the generator has a short-circuit against ground, or chassis of the system. Likewise, a break of the cable or line leading from the generator to the battery is indicated by providing yet another threshhold switch which determines if the battery voltage is greater than a predetermined reference level, that is, is rising excessively above rated design value. The indicator itself, usually, is an incandescent lamp which should be protected against highly excessive overvoltages—brief, or minor overvoltages being tolerated by the usual indicator lamp. An additional threshhold stage can be used to determine if the level of the generator is above yet a still higher threshhold and, if this threshhold stage responds, to initiate emergency control of the generator to prevent still further excessive rise of generator voltage, while, simultaneously, interrupting connection to the indicator lamp to prevent its burning out.

A comparator device can be provided to indicate if battery voltage drops below a predetermined value and, then, provides a malfunction output indication which can be so arranged that it indicates regardless of operation of the generator, thus providing an indication of the charge-state of the battery. A break of the connecting line between the main switch and the control line leading to the shield of the generator can, also, be indicated by the comparator since, upon failure of field excitation, the battery voltage, and the load, will continue to drop. The output of the comparator can also be used to indicate an interruption of current supply to the loads.

The comparators and threshhold switches can be constructed in the form of operational amplifiers, in integrated circuit form. The sensitivity of these devices is high, and since comparisons are effected, the calibration is essentially immune to external temperature influences or drifts. Although, in a circuit diagram, comparisons may appear to be non-existent because connections to comparator inputs appear short-circuited by connecting lines, in actual construction a voltage difference will arise due to the voltage drop across the respective connecting wires or cables. In many installations, for purposes of power use, such voltages drops can usually be neglected; they can, however, be used as sensing signals to determine proper functioning by sensing current flow therethrough, as determined by the voltage drop, small as it may be, across respective junctions of the cables.

DRAWINGS

FIG. 1 is a simplified network diagram of an entire on-board vehicular network, including the battery charging and malfunction recognition system; and FIG. 2 is a functional circuit diagram of the control system and the charge control and monitoring arrangement of the overall system of FIG. 1.

A three-phase alternator 10, as shown schematically in FIG. 1, has three armature windings 11 which provide output power which is rectified in a three-phase bridge power rectifier 12, having negative rectifier diodes 12a and positive rectifier diodes 12b. The rectifier 12 has two negative terminals forming the ground, or chassis connection B—, and two positive output terminals B+. The three-phase winding 11 additionally has a half-wave bridge rectifier formed by malfunction recognition diodes 14 connected thereto, the cathodes of which are connected to two further positive terminals D+ of the generator. The terminals D+ are the malfunction recognition terminals. The generator, as is customary, has an exciter or field-winding 16 which has one terminal connected to a field terminal DF, and another to terminal 17. The components which can be physically integrated with the generator and its housing are shown within the outline of the generator 10, in schematic chain-dotted representation.

A voltage regulator 20 is connected to the generator, for example by being physically integrated therewith or with the brush-holder (23) which holds the brushes supplying current to the field 16. The voltage regulator has a semi-conductor power switch 21, for example in the form of a Darlington transistor, or the like, forming a power-switching portion and a control section 22. The voltage regulator 20 together with the brush-holder 23 forms one constructional unit. The power switching portion 21 is connected in a supply line or connection formed by conductive paths 24, leading from terminal DF through the power-switching path of the semi-conductor power-switching element 21 to the terminal D— of the brush-holder 23. The two terminals of the brush-holder 23 are connected to the corresponding terminals DF and D— of the alternator 10. The control portion 22, preferably constructed as an integrated circuit, has nine terminals 26 to 34; terminal 26 is connected over resistor 35 with terminal 36 of the brush-holder 23. Terminal 27 is connected over resistor 37 and a further line 38 with a terminal 39 of the brush-holder 23. Two lines 40, 41 branch off from line 38. Line 40 is connected, over a free-running or free-wheeling diode 42 to the collector of the semi-conductor power-switch 21 and to the terminal DF. The line 41 is connected to terminal 17 of the brush-holder 23. The free-wheeling diode 42, thus, is electrically parallel with the field 16 of the alternator.

Terminal 28 of the control portion 22 of the voltage regulator 20 is connected through a resistor 44 and line 43 to line 40. Terminal 29 is connected through a resistor 45 with a terminal D+ of the brush-holder 23 which, in turn, is connected to the terminal D+ of the generator 10. Terminal 30 is connected over a resistor 47 to a line 46 and then to the collector terminal of the semi-conductor power switch 21 and to the terminal DF of the generator. Terminal 31 is connected to the control input of the semi-conductor power switch, typically a transistor, 21. Terminal 32, also forms the D—, or chassis or ground connection of the system and is connected to the emitter of the semi-conductor power switch 21. Terminal 33 and 34 of the control portion 22 are discrete elements of a charge control system, which will be described in detail below.

Terminal B+ of the alternator 10 or, rather, of the output of the rectifier 12 thereof, is connected over a line 49 to a junction 50 of the on-board vehicular network. A connecting line 51 leads to the positive terminal of the battery 52, the negative terminal of which is grounded, as indicated by the chassis connection B—, which is also connection to the terminal D— of the generator. Junction 50 further is connected over respective switches 53 with selectively connectable loads 54, shown only schematically. The junction 50 additionally is connected through a line 55 to the main switch 56 which, in case of an external ignition engine, typically is the ignition switch. The terminal remote from the line 55 is connected over a line 58, with an indicator lamp 59 interposed, with the terminal 36 and, over a second line 60, without a control lamp, with the terminal 39 of the control portion 20 of the voltage regulator 20, that is, of the brush-holder 23 respectively.

Reference voltage for the voltage regulator can be obtained in various ways, for example by a Zener diode; the present application uses a different system, namely a constant current source, which provides a current, of constant value, to a voltage divider, from which various reference voltages can be tapped off.

Referring now to FIG. 2: the control portion 22 of the voltage regulator 20 has its terminal 27 connected to a constant current source 62, providing an output constant current IC which is unvarying, regardless of the voltage of the battery, or of the network, respectively. The constant current source 62 is connected by a line 63 to a voltage divider 64 which has a plurality of tap points, as will appear, the other end terminal is connected to the ground or chassis terminals D−, B−, that is, terminal 32 of the voltage regulator 20. The voltage divider 64 provides reference voltages for six threshhold stages 66 to 71, as will appear below. The terminal 28 of the control portion of the voltage regulator 20 is connected through a temperature matching or compensation circuit 72, which may include a voltage divider having a temperature-sensitive resistor, to two output lines 73, 74. The output line 73 is connected to one input of the threshhold switch 66, the other input of which is connected to a tap point on the voltage divider 64. Line 74 is connected to an input of threshhold switches 68, 69, respectively, the other inputs of which are connected to receive voltages from the voltage divider 64 which will be unvarying, since the current therethrough is a constant current supplied by source 62. The second inputs of the threshhold stage switches 67, 70, 71 are connected over a line 75 to terminal 29 of the control portion 22 of the voltage regulator, to which a switching element 76 is also connected to permit emergency control of the voltage regulator under emergency conditions. The output of the switching element 76 is connected to the threshhold switch 66. The output of threshhold switch 66 is a line 77 which is connected through a timing circuit 78 and an amplifier 79 to terminal 31 of the control portion which, as noted, controls the conduction state of the field or exciter supply control semi-conductor switch 21.

The output signals of the threshhold switches 67, 68 are connected to an AND-gate 80, the output of which is connected to an OR-gate 81. The output signal of the threshold switch 69 is connected to one input of an AND-gate 83, which receives its other input from an inverter 82 connected to terminal 30 of the regulator which, as noted, is connected through resistor 47 to line 24 and hence to terminal DF. The output of the AND-gate 83 is connected, likewise, to the OR-gate 81. AND-gate 84 is connected to the outputs of the threshhold switches 70 and 71. AND-gate 85 is connected to the outputs of threshhold switch 67 and to the output of the inverter 82. The outputs of the AND-gates 84, 85 are connected to the inputs of the OR-gate 81.

The OR-gate 81 is combined with a timing circuit 86, which may be a single unit. The timing circuit 86 has an external, or discrete timing capacitor 87. Timing capacitor 87 is electrically connected with the electronic timing circuit 86. The timing circuit 86 controls a further OR-gate 88, the output of which is connected to control a semi-conductor switch, shown as switching transistor 89 interposed in a control line 90 of an electronic semi-conductor switch, shown as a transistor 91 through terminal 33. Line 92 is interposed between the terminals 36 and 32 of the control section or portion 22 of the voltage regulator. The line 90 includes the terminal 33, and controls conduction of the transistor 91.

A second input of the OR-gate 88 is connected to the output of a comparator 94. Comparator 94 has a first input connected by line 95 to line 63 from the constant parent source 62. The second input of the comparator is connected to terminal 26 of the control portion of the voltage regulator.

Dimensioning of threshhold levels and basic operation: the threshhold stage 66 provides a positive output signal causing the switch 21 to conduct if the output voltage $u_s$ on line 73, derived from the battery and connected to the sensing input of the voltage regulator is below a reference voltage derived from the reference level determined by the flow of constant current from constant current source 62 through the voltage divider 64, shown as reference voltage $u_r$. In the embodiment of FIG. 1, the sensing input is terminal 39 of the voltage regulator 20 or the brush-holder 23, respectively, connected with the terminal 57 of the main switch remote from the battery 52. Other sensing terminals can be used, for example the terminal B+ of the generator 10, which is the embodiment in FIG. 2, where the sensing voltage is derived through the temperature compensation stage 72; stage 72 is not strictly necessary. This stage, if used, introduces a temperature compensation factor Tk, to allow for temperature differences of response of the battery in dependence on the temperature at which the battery operates.

Threshhold stage 67: it provides a positive one-output signal necessary to cause the monitoring lamp 59 to illuminate, which will occur if switch 91 is rendered conductive, when and if the voltage of the generator $u_g$ on the malfunction indicator terminal D+—which corresponds to the voltage actually generated by the generator—is not over a maximum voltage $u_{rmax}$. This voltage $u_{rmax}$ is that voltage which is generated only due to the magnetic remanence of the excitation system of the gernerator at the maximum speed thereof.

Threshhold stage 68: a positive one-signal at its output, to cause switch 91 to conduct, is provided when the sensed voltage $u_s$ at the sensing input 27, or on the terminal B+ of the voltage regulator, respectively, is below the reference or control voltage $u_r$ derived from the voltage divider 64 and the constant current source 62, by a predetermined difference $\Delta u_1$.

Threshhold stage 69: positive response is provided if the sensing voltage u/s derived for example as above, exceeds the reference voltage u/r, derived through constant current source 62 in the voltage regulator 64, by a predetermined difference value $\Delta u_2$.

Threshhold switch 70: one of its inputs is connected to the malfunction indicator terminal D+; the other to the voltage divider 64. It provides a one-signal positive output upon indication of malfunction, that is, when the generator voltage $u_g$—terminal DF—exceeds a predetermined first limit, for example 17 V.

Threshhold switch 71: provided to protect the monitoring lamp 59 against overload; threshhold switch 71 provides a positive one-output signal if the actual generator voltage $u_g$—terminal D+—is still below a second and upper limiting value $u_{71}$. This may, for example, be below the burn-out level of the indicator lamp 59 and, for a nominal 12 V system, for example at about 24 V.

Switching stage 76 is provided to block conduction of the voltage regulator power switch 21, by overriding control of the switch 66 if the generator voltage $u_g$ exceeds a third limiting value $u_{76}$ for example for a 12-volt network, 18 V. The reference voltage $u_{76}$ can be derived, for example, from the voltage regulator 64, from a Zener diode, and the like, and is applied to the stage 76 as schematically indicated by terminal 76a, although, of course, it can be internally derived, the showing being merely schematic.

Comparator 94: a connection one-signal for the monitoring lamp 59 is provided when the voltage supply potential $u_s$ at terminal 27 of the voltage regulator is interrupted, that is, if no current flows through the voltage regulator 64. This is the case if, for example, the current path leading to the field winding 16 of the generator, between the main switch 56 (FIG. 1) and terminal 39 of the regulator as interrupted. Comparator 94, then, will so switch over that its current supply will be derived through the monitoring lamp 59 for which it provides the definite or positive connection signal.

Timing circuit 86 is so constructed that its connection delay corresponds at least to the time period during which the voltage of the generator rises, as its speed increases, and due only to remanent magnetism. In other words, it corresponds to the time required for the minimum possible remanent voltage—which is approximately zero V—until the maximum possible voltage due to remanent magnetism, at maximum speed, is reached.

With respect to charge of the battery and maintenance of battery voltage, the system operates similarly to known systems with separate field excitation of the generator, as is standard in the field. No further discussion, thereof, is therefore needed herein.

Operation with respect to monitoring and emergency control upon malfunction: various operating modes of the system are possible: operating conditions, and most likely arising malfunction conditions will be described as follows:

1. Normal Operation
   1.1 Starting-generator stopped
   1.2 Generator starting, system operating normally
   1.3 Generator overload, system operating normally
   1.4 Load disconnection from battery, system normal
2. Malfunction
   2.1 Drive-belt breakage
   2.2 Field interruption, regulator defect
   2.3 Field interruption, generator defect
   2.4 Excessive field, regulator short-circuit
   2.5 Break in battery supply cable
   2.6 Break of exciter connection between main switch and regulator.

1.1, Starting-generator stopped: with the generator stopped, $u_g$ will be below the command or control voltage $u_r$ obtained from the voltage divider 64 and constant current source 62. The sensing path, over the main switch 56 and line 60 to the voltage regulator input and, continued, over the temperature compensation stage 72 to the threshold stage 66 will, thus, be at a lower voltage than the reference path through the voltage divider 64. The switch 21 of the voltage regulator, then, will be rendered conductive. The DF voltage will drop to approximately zero or chassis or ground voltage. The voltage $u_g$ at the malfunction output terminal D+, with the voltage regulator stopped, will also be effectively zero. The threshhold stage 67 thus provides a one-output to the AND-gate 80. The terminal DF, as noted, will be at effectively zero voltage, so that inverter 82 likewise will provide a one-signal to the AND-gates 83 and 85. Gate 85, thus, will have two one-inputs causing OR-gate to become conductive and the timing unit 86 will be started, to commence a timing interval. Switch 91, likewise, will be energized through the OR-gate 88, energizing switch 89 and hence rendering switch 91 conductive so that the monitoring lamp 59 will be connected to ground or chassis through terminal 32 and hence will receive full power and will light.

1.2, generator run-up, system functioning properly: the power switch 21 of the voltage regulator is energized—see above—upon response of the threshhold switch 66. It will remain energized until the actual sensed voltage $u_s$ on the sensing line equals or exceeds the command or reference voltage $u_r$. This may occur, for example, at a generator speed (not necessarily engine speed) of about 1,200 rpm. Upon rising generator speed, the generator voltage $u_g$ on the malfunction indicating terminal D+ likewise rises. When the voltage $u_g$ exceeds the threshold level $u_{rmax}$ of stage 67, stage 67 will switch its output to zero and thus the inputs to the AND-gates 80, 85 at one of their terminal will be a zero-signal. This causes blocking of the AND-gate 85 and the "stopped" indication signal of the AND-gate 85 is inhibited, and thus the indication by monitoring lamp 59 likewise is inhibited. Additionally, the sensed voltage $u_s$ likewise will be above the threshhold value $u_r = \Delta u$ of the threshhold stage 68 and the indication which might occur if the sensing voltage $u_s$ drops below the threshhold value and which might trigger indication of the lamp 59 is inhibited by the zero-input to the AND-gate 80 from the threshhold switch 67.

1.3, generator overload, system functioning normally: the sensing voltage $u_s$ will now drop below the command or reference voltage $u_r$. When the sensing voltage $u_s$ drops below the threshhold value of stage 69, a one-signal therefrom will appear on one input of the AND-gate 80. The system, as assumed, operates properly and the generator supplies power. The voltage regulator, thus, must be energized, that is, must have energized field because the command voltage $u_r$ has been passed. The voltage $u_g$ on the malfunction indicating terminal D+ is greater than the maximum possible remanence voltage $u_{max}$. Consequently, the stage 67 provides a zero-signal to the second input of the AND-gate 80. Provided the system is functioning properly, therefore, and the generator is rotating and providing output, malfunction indication at $u_s > u_r - \Delta u_1$ is suppressed.

Excessive current draw from the generator is prevented, however, by the usual fuses present in the on-network, not shown and as customary in network protection.

1.4, load disconnection from battery, system normal: voltage peaks or rapid voltage fluctuations may occur on the sensing line, and the voltage $u_s$ may exceed the value of the reference voltage $u_r$ plus the differential increase $\Delta u_r$. This causes response of the threshhold stage 69 which provides a one-input to the AND-gate 83. Since the reference voltage has been exceeded, however, and assuming—in accordance with the example—that the voltage regulator is operating properly, the power switch 21 is blocked. Thus, a one-signal appears at terminal DF. The inverter 82 inverts the signal to form a zero-signal to the second input of the AND-gate 83. Consequently, the AND-gate 83 has a zero-signal thereon, and malfunction indication due to excess voltage on a sensing line, with the regulator functioning properly and inhibiting current flow through the field, is likewise suppressed.

After disconnecting a load, the voltage $u_s$ on the sensing line will rise above the reference value $u_r$. This causes the main power switch 21 to block, and collapse of excitation. The output signal of the inverter 82 changes over to a zero-signal so that the comparator 69 will not provide an output indication, as above described.

Upon disconnection of a load, the remaining loading on the on-board network may be such that the current required thereby can be entirely supplied by the generator. If the battery, previously, was fully charged, no discharge from the battery will occur. If additional load, then, is disconnected, current will continue to flow from the generator into the battery, however, which changes in accordance with the time constants of the generator current supply, with time, upon inhibition of excitation. This first raises the battery voltage and the sensing voltage $u_s$. The battery voltage will decay, based on the battery time constant. The battery time constant of battery voltage decay however, is much longer than the time constant of the generator. The generator excitation, thus, will be inhibited. This causes the voltage $u_g$ on the malfunction indicating output terminal D+ to drop, based on the decay time constant of the generator. The drop will be down to the remanent voltage level, that is, the non-excited level of the generator. This level is smaller than the maximum possible remanent voltage, and hence the following switching cycle will be initiated:

(a) The threshhold stage 67 provides a one-signal to the input of AND-gate 88. The voltage at the sensing line $u_s$ is greater than the reference voltage $u_r$ and consequently, threshhold stage 68 provides a zero-signal to the second input of the AND-gate 80, which will not provide an output.

(b) When the sensing voltage $u_s$ exceeds the threshhold $u_r + \Delta u$ of threshhold stage 69, a one-signal will be applied to the input of AND-gate 83. As assumed, the voltage regulator power switch 21 is blocked, and thus inverter 82 provides a zero-signal to the second input of the AND-gate 83, which will block and thus not permit a malfunction indication.

(c) Threshhold stage 67 has also applied a one-signal to one input of the AND-gate 85. The other input of AND-gate 85 receives a zero-signal from the inverter 82. Consequently, AND-gate 85 will not provide a malfunction indication to cause monitoring lamp 59 to light by conduction of switch 91. AND-gate 84 likewise will not be enabled.

If, during the time in which the generator still does not receive field current, load is connected to the system, the voltage $u_s$ at the sensing line will drop. This drop will soon cause the voltage to drop below the command or reference value $u_r$ which causes switch 21 again to become conductive and the following cycle will then be initiated: the voltage $u_g$ on the malfunction terminal D+ will rise, after the regulator has been again conductive, that is, switch 21 permits current to flow through the field 16 of the alternator. For some period of time, the voltage $u_g$ will still be below the response of the threshhold stage 67. During this time the one-signal at the output of stage 67 will remain. When the sensing voltage $u_s$ drops below the threshhold value $u_r - u_1$ of threshhold stage 61, the one-signal will be applied to AND-gate 80 so that AND-gate 80 will become conductive and apply an output through OR-gate 81 to the timing circuit 86.

In addition, the two inputs of the AND-gate 85 will have a one-signal appear thereafter, since the voltage $u_g$ will be less than the threshhold value of the threshhold stage 67, and, additionally, the main power semi-conductor switch 21 is conductive, so that the timing circuit 86 also is controlled to start its timing interval by a one-signal AND-gate 85. The timing circuit 86, depending on the level of the sensing voltage $u_s$ will be energized, either by both AND-gates 80 and 85, or solely by the AND-gate 85 until the voltage at the malfunction terminal D+ has again exceeded the maximum possible remanent voltage. When the maximum remanent voltage has been exceeded, threshhold stage 67 again switches over to a zero-signal causing both of the AND-gates 80 and 85 to block. As noted above, the timing circuit 86 is so dimensioned that it will not provide an output signal unless the time constant of voltage rise of the generator is exceeded. This is not the case under normal operation, however, and the monitoring lamp 59 remains extinguished.

Under normal operation, therefore, lamp 59 will not provide output indication, regardless of operating mode of the system.

Operation under malfunction conditions:

2.1, Drive-belt breakage. Upon break of the belt, typically a V-belt to the generator, the generator will stop, and the monitoring lamp 59 will light as under the condition of stop-generator upon starting, see 1.1.

2.2, Field interruption, regulator defect: Malfunction may occur within the operation of the voltage regulator. If the power switch 21 in the voltage regulators should burn out, or block due to malfunction thereof or in the control circuit, the voltage $u_g$ at the malfunction recognition terminal D+ will drop to the remanent voltage. This causes the threshhold stage 67 to provide a one-signal to one-input of the AND-gate 80. The voltage at the sensing line $u_s$ likewise will drop. When this voltage drops below the threshhold level $u_r - \Delta u$, the threshhold stage 68 will provide a positive output signal, causing the AND-gate 80 to become conductive and monitoring lamp 59 will light and provide a malfunction indication.

2.3, Field interruption, generator defect: various defects may occur in the excitation circuit of the generator, for example in the region of the brush-holder 23. The remanent voltage only then will appear on the malfunction indication terminal D+. Threshhold stage 67 will control the AND-gate 85 to become conductive; since, however, due to failure of shield, the sensing voltage $u_s$ will also fall below the reference voltage $u_r$, the switch 21 will become conductive, dropping the voltage at terminal DF to zero or null. Inverter 82 provides the inverted one-signal to the AND-gate 85, causing connection of the monitoring lamp 59 via the time circuit 86. Interruption in the excitation of the generator, thus, is evaluated as stop condition of the generator.

2.4, Excessive field, regulator short-circuit: A short-circuit between the DF terminal and ground may occur due to malfunction in the regulator, for example upon alloying-through of the transistor forming the switch 21. This causes the output of the inverter 82 to supply a one-signal. The sensing voltage $u_s$ will rise rapidly and exceed the value of $u_r + \Delta u_2$ and, consequently, the AND-gate will be controlled via threshhold switch 69 to provide a malfunction signal to the gate 89 which will cause lamp 59 to light. The gate 83 will provide a one-output signal to the OR-gate 81 causing, through OR-gate 88, conduction of switch 81 and hence switch 91 and illumination of lamp 59, which will be connected between battery and ground.

2.5, Break in, battery supply cable: the battery cable may break between the terminals D+ of the generator and the positive terminal of the battery 52; or the terminals may become so corroded that such a high resistance connection will appear so that in effect, charging of the battery through the alternator is inhibited. Consequently, the battery voltage will drop below the reference level $u_r$, which is transmitted through the main switch 56 to the sensing line 60 and hence to the voltage regulator control portion 22. As the battery voltage drops, power switch 21 of the voltage regulator will be rendered conductive. The voltage at terminal B+ of the generator as well as on the malfunction recognition terminal D+ will rise. Depending on the speed of the generator, voltages greater than 150 volts may arise unless remedial action is initiated.

Voltage rise on the malfunction recognition terminal D+ is sensed by the threshhold stage 70 and evaluated to provide a one-signal to the AND-gate 84. The same signal also is appoied to threshhold stage 71 which will supply a second enabling input to AND-gate 84 causing, through OR-gate 81 and OR-gate 88 and switch 89 the switch 89 to conduct and hence lamp 59 light. The threshhold level of threshhold stage 71 provides a zero-output when its threshhold level is exceeded. As the voltage $u_g$ at terminal B+ reaches the threshhold level of threshhold stage 71, the one-signal thereof will switch to a zero-signal, causing the indicator lamp 59 to extinguish, thereby protecting the lamp 59 against over-voltages. In addition to the previously indicated malfunction, however, an emergency control of the generator is effected.

When the voltage $u_g$ on the malfunction indication terminal D+ reaches the threshhold level $u_{76}$ as determined by stage 76, for example 18 V, the stage 76 interferes with the normal control process in the dependence on the sensing line and limits the voltage at the terminal B+ of the generator and hence on the malfunction recognition circuit D+ to a predetermined value, for example to limit the voltage to a predetermined value. As shown, the output of stage 76 is connected to the comparator 66. A different output may also be used, for example to switch in circuit a dropping, dissipating resistor connected to line 49 (FIG. 1) and ordinarily out-of-circuit, to be connected only in case of excessive generator voltage.

2.6, Break of exciter connection between main switch and regulator: the connecting line between the voltage regulator and the main switch 56 may be interrupted. This causes the excitation current for the generator, as well as current supply for the entire system to drop out. As far as the current supply network is concerned, the result will be the same as interruption of excitation of the generator. The indication cannot, however, evaluate such an interruption since current supply is interrupted. Yet, the comparator 94 will determine that the voltage of the line connected to line 63, the constant current source, is substantially below the voltage of the input connected to the terminal 26. This causes comparator 94 to switch over, so that it will receive its current supply through the monitoring lamp 59 and the terminal point 26 then will furnish the one-signal in order to command switch 91 to conduct and, in spite of interruption of line 60, a malfunction indication can be obtained.

Various changes and modifications may be made within the scope of the inventive concept.

The resistors 35, 37, 44, 45, 47 are dropping and coupling resistors; element 29a (FIG. 2) is a voltage divider to normalize the voltage at terminal D+ and 29 with respect a suitable voltage level tapped off from voltage divider 64.

In addition to providing malfunction indication based not only on malfunction of the voltage regulator, inherently, but also on other elements and components associated with the network, the system permits easy diagnosis of trouble. Thus, the outputs of the respective threshhold switches, which, effectively operate as comparators, that is, switch 66 to 71, as well as comparator 76 and comparator 94 may be used for diagnostic purposes. The output terminals of these elements are connected to a suitable test-panel; testing for voltages at the respective outputs will immediate provide an indication whether the signals are one-signals or zero-signals and, under given operating conditions, for example a predetermined speed of the alternator, the nature of the defect can be diagnosed, for example whether the switch 21 is alloyed-through, or open-circuited; or if there are other defects in the generator, or in control system, or in the network connected thereto.

We claim:

1. For combination with a self-contained electrical network having
   an a-c generator (10) having a field-winding (16);
   a power rectifier (12) connected to the generator and providing d-c output power at output terminals (B+, B−);
   a battery (52) having positive and negative terminals (50, B−) and providing a battery or system voltage ($u_s$);
   a battery cable (49) connected between the positive output terminal (B+) of the rectifier and the positive terminal (50) of the battery (52);
   a plurality of loads (54) selectively connectable (53) between the battery terminals;
   a voltage regulator (20) connected to the generator terminals and having a controlled power switch (21) which is serially connected to the field winding (16), and reference means (62, 63, 64) connected to compare the voltage of the output of the generator with a reference determined by the reference means and controlling the controlled power switch to conduct, or block current flow therethrough;
   a network component malfunction indicator system having
      sensing means (82) connected (24, 30, 47) to the controlled power switch (21) and sensing the state of conduction thereof;
      a malfunction indicator (59), and controlled switch means (91) connected thereto;
   and logic circuit means connected to and controlling the controlled switch means of the malfunction indicator including
      threshhold stage means (67, 69) connected to a terminal having thereon a voltage representative of the voltage of the output of the generator to respond to the voltage of the output of the generator, and control said controlled switching means (91) to provide a malfunction output indication if the voltage of the generator output is beyond a predetermined range,
and comprising
means (14) deriving a generator sensing signal ($u_g$) of generator voltage solely due to the generator excitation and independent of battery voltage;
and wherein the threshold stage means comprises
a first threshhold stage (67) receiving said generator sensing signal and providing a first control signal if the generator voltage ($u_g$) exceeds a predetermined level ($u_r$max),
and a second threshhold stage (69) receiving a signal representative of battery, or system voltage ($u_s$) and providing a second control signal if the battery or system voltage ($u_s$) passes below a predetermined level ($u_r - \Delta u_1$).

2. System according to claim 1 wherein the generator sensing signal deriving means comprises
a bridge rectifier (14) independent of the power rectifier (12) and furnishing an output sensing voltage signal effectively solely responsive to the extent of excitation of the generator and the operating speed thereof.

3. System according to claim 2 including a connection line (17, 41, 60) from the battery terminals to the field winding (16).

4. System according to claim 1 wherein the threshold level of the first threshhold stage (67) is set to cause said first threshhold stage to respond if the generator voltage ($u_g$) as determined by said generator sensing signal is above the voltage level ($u_r$max) due solely to remanent magnetism of the field of the generator at maximum operating speed thereof and without any excitation current flowing through the field winding.

5. System according to claim 3 wherein said logic means includes an AND-function gate (85) receiving the first control signal from said first threshhold stage and a power switch sensing signal derived from said sensing means (82) and representative of conduction of said power switch (21), said AND-function gate (85) providing an output signal to control said malfunction indicator to provide a malfunction indication if
(a) the power switch sensing signal indicates that the power switch is conductive, and
(b) the first control signal is present to indicate that the generator voltage ($u_g$) is below the threshhold level of said first threshhold stage.

6. System according to claim 1 wherein said threshhold stage means includes a third threshhold stage (68) receiving a signal representative of battery or system voltage ($u_s$) and providing an output if said signal ($u_s$) differs by a predetermined value ($\Delta u_1$) from a reference command value $u_r$;
and said logic means includes a logic AND-function gate (80) providing an enabling output to control said malfunction indicator to provide a malfunction indication if
(a) the generator voltage ($u_g$) is not less than the threshhold level of said first threshhold stage and
(b) the battery or system voltage ($u_s$) is below the threshhold level of said third threshhold stage (68).

7. System according to claim 4 or 5 further including a time delay element (86) forming part of said logic circuit means and connected in advance of the malfunction indicator to delay indication of the malfunction indicator although said threshhold stage means has responded and controlled said controlled switching means (91) to provide a malfunction output indication, said time delay element having a delay time which is at least as long as the delay in the generator sensing signal representative of generator voltage from minimum voltage to maximum voltage due solely to remanent magnetism of the field and without flow of field current through the field winding (16) between minimum and maximum speed of the generator.

8. System according to claim 1 wherein said logic circuit means includes a fourth AND-function gate (83) connected to said sensing means (82) and to said second threshhold stage (69);
and a time delay element (86) connected in advance of the controlled switching means (91) to delay response to the malfunction indicator even though said fourth AND-function gate has provided an output representative of
(a) battery or system voltage ($u_s$) greater than the predetermined level ($\Delta u_2$) above a command reference ($u_r$) voltage and
(b) an output from said sensing means indicative of conduction of said controlled power switch (21).

9. System according to claim 1 wherein said threshhold stage means includes a "high voltage" threshhold stage (70) connected to receive the generator sensing signal ($u_g$) and providing an overvoltage output signal if said generator sensing signal is above a "high voltage" level ($u_{70}$),
said "high voltage" level being above the threshhold level of the second threshhold stage.

10. System according to claim 9 further including an "excess voltage" threshhold stage (71) connected to receive said generator sensing signal ($u_g$) and providing an output signal if the generator sensing signal indicates that the voltage of the generator at said generator sensing signal deriving means (14) is below an "excess voltage" level ($u_{71}$);
and wherein said logic circuit means includes a high voltage AND-function gate (84) connected to said controlled switching means (91) and permitting response of the malfunction indicator only if the excess voltage threshhold stage (71) has not responded, to prevent damage to the malfunction indicator (69).

11. System according to claim 1 further including a high voltage level safety stage (76) connected to receive the generator sensing signal, and providing an override control signal to said controlled power switch (21) to prevent conduction thereof, and hence current flow through the field winding if said high voltage level sensing stage senses voltage at said generator sensing signal deriving means in excess of a predetermined high voltage level ($u_{76}$).

12. System according to claim 11 wherein the voltage regulator (20) includes a comparator (66) receiving as one input a signal representative of battery or system voltage ($u_s$) and having a second input receiving a reference signal voltage ($u_r$);
and wherein said high voltage level sensing stage (76) is connected to inhibit control operation of said comparator tending to cause closing of said power switch (21) and hence current flow through the field winding (16) if said high voltage level stage (76) has responded to sense a generator voltage sensing signal ($u_g$) above that high voltage level ($u_{76}$).

13. System according to claim 1 wherein a comparator (94) is provided having a first signal input connected to receive a signal representative of battery voltage and a second signal input connected to said reference means and providing an output indication if a reference signal as determined by said reference means differs from the battery voltage by a predetermined level, said comparator controlling said control switching means (91) to cause a malfunction indicator to provide a malfunction output signal if the reference signal has failed and hence differs from the battery voltage by a level exceeding said predetermined level to thereby provide an output indication of failure of proper control of said voltage regulator.

14. System according to claim 13 wherein said malfunction indicator (59) also forms a charge control indicator;
  a main switch (56, 57) is provided, connected between one of the battery terminals (50) and the malfunction indicator (59), and forms a common junction (57) therewith, said common junction being additionally connected through said connection line (60) to the field winding (16);
  and wherein one of the inputs of the comparator is connected to the malfunction indicator at a side remote from said common junction (58, 36, 35, 26, 96) and the other input to the comparator (95) is connected to said common junction (57).

15. System according to claim 13 wherein a main switch (56) is provided, connected between one of the terminals (50) of the battery (52) and a connecting line (60) connected to one of the terminals (39, 17) of the field winding (16);
  the malfunction indicator is connected through said main switch (56) to said one battery terminal (50) and to a junction (36) serially connected with said controlled switching means (91);
  and wherein said comparator has one input connected to said junction (36) and the other input (95) connected to said connecting line (60).

16. System according to claim 1 wherein said a-c generator (10) and said voltage regulator (20) are interconnected at terminals or junctions (36, 39, B+, B−, D+, D−, DF);
  and said threshhold stage means and said logic circuit means are connected to said terminals or junctions to additionally monitor operability of the battery cable, the battery, and connecting lines of the network.

* * * * *